United States Patent
Terrell

(10) Patent No.: US 8,944,759 B2
(45) Date of Patent: *Feb. 3, 2015

(54) LIVESTOCK COOLING FAN SYSTEM

(71) Applicant: Michael Terrell, Tempe, AZ (US)

(72) Inventor: Michael Terrell, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/051,973

(22) Filed: Oct. 11, 2013

(65) Prior Publication Data

US 2014/0037427 A1 Feb. 6, 2014

Related U.S. Application Data

(63) Continuation of application No. 13/021,541, filed on Feb. 4, 2011, now Pat. No. 8,585,361.

(60) Provisional application No. 61/301,498, filed on Feb. 4, 2010.

(51) Int. Cl.
*F01D 25/28* (2006.01)
*F04D 29/58* (2006.01)
*F24F 5/00* (2006.01)
*A01K 1/00* (2006.01)
*F24F 6/14* (2006.01)

(52) U.S. Cl.
CPC .............. *F04D 29/58* (2013.01); *F24F 5/0035* (2013.01); *A01K 1/0082* (2013.01); *F24F 6/14* (2013.01); *A01K 1/0052* (2013.01); *Y02B 30/545* (2013.01)
USPC ................... 415/213.1; 415/127; 416/244 R; 416/100

(58) Field of Classification Search
CPC ....... F01D 25/28; F01D 25/24; F01D 25/243; F04D 19/002; F04D 25/06; F04D 25/10; F04D 25/105; F04D 25/166
USPC ................... 416/244 R, 246, 148, 149, 600; 415/213.1, 60, 126, 127, 128; 119/448
See application file for complete search history.

(56) References Cited

U.S. PATENT DOCUMENTS

| | | | | |
|---|---|---|---|---|
| 4,476,809 A | * | 10/1984 | Bunger | 119/436 |
| 6,283,709 B1 | * | 9/2001 | Hill et al. | 416/110 |
| 6,340,283 B1 | * | 1/2002 | Hedger et al. | 415/60 |
| 6,578,828 B2 | | 6/2003 | Terrell et al. | |
| 6,588,372 B1 | * | 7/2003 | Terrell et al. | 119/448 |
| 6,675,739 B2 | * | 1/2004 | Terrell et al. | 119/448 |
| 6,883,251 B2 | | 4/2005 | Terrell et al. | |
| 7,547,364 B2 | * | 6/2009 | Polak | 134/26 |
| 8,585,361 B1 | * | 11/2013 | Terrell | 415/213.1 |

* cited by examiner

*Primary Examiner* — Edward Look
*Assistant Examiner* — William Grigos
(74) *Attorney, Agent, or Firm* — James M. Duncan, Esq.; Klein DeNatale Goldner

(57) ABSTRACT

A fan cooling system has individual fan modules which are connected together in an end-to-end configuration, where one of the fan modules is connected to a mechanism which rotates the linear array of fan modules. The fan modules are substantially identical, which allows prefabrication of the fan modules prior to on-site installation of the system. Each fan module may contain water injection piping and nozzles, which allows the fan cooling system to dispense fog. The linear array of fan modules may be rotated along a longitudinal axis, such that the axial flow direction of the fans may be changed with respect to a vertical plane. A suggested use of the fan cooling system is for the cooling of livestock in large livestock structures.

13 Claims, 10 Drawing Sheets

LIVESTOCK COOLING FAN SYSTEM

CROSS-REFERENCE TO RELATED APPLICATIONS

This is a continuation of U.S. application Ser. No. 13/021,541 filed on Feb. 4, 2011 which claims priority to U.S. Provisional Application No. 61/301,498 filed on Feb. 4, 2010.

BACKGROUND OF THE INVENTION

The present invention generally relates to cooling systems of the type generally used for the cooling of livestock and more specifically to a programmable system for efficiently using cooling fans to create an environment which protects the health and productivity of animals.

It is known in animal agriculture to cool livestock by the utilization of cooling fans. The known cooling systems typically use either fixed mounted fans, or fans which may be rotated about a vertical axis such that the angular orientation of the air flow from the fans may be varied along a horizontal plane, in either a fixed or oscillating manner. While the air flow from a fan may disperse in a variety of directions, particularly where diffusers are utilized, axial-flow fans have blades which force air to move parallel to the shaft about which the blades rotate. This direction, defined by the position of the fan shaft, is referred to herein as the axial flow direction, or simply "axial flow". While such livestock systems may include some provision for adjustment of the vertical orientation of the axial flow, there is no known system which provides for large (i.e. greater than 45 degrees) or programmed simultaneous changes in the axial flow of a fan array along a vertical plane.

There are advantages to such functionality. The inventor herein has determined that having the ability to induce vertical changes in the axial flow allows compensating the air/mist flow from the fan for varying wind speeds and directions. Livestock cooling fans are, by necessity, typically mounted higher than the animals and mounted at a fixed angle on the vertical plane so that the axial flow is directed towards the animals. This orientation works well when winds are light or calm, but as wind speeds increase, or the wind direction changes, it is quite common for the air (and, if applicable, mist/fog) generated by the fans to be blown away before it can reach the animals.

The present invention allows the fans, and thus the axial flow, to be repositioned on the vertical plane to compensate for the speed and direction of the wind and thus optimize the cooling air/mist reaching the animals.

As another advantage, the fans may be "parked" in a completely vertical orientation where the fan blade is subjected to little or no wind, which prevents free-wheeling of the fan and reduces starting torque. This functionality further allows the fan units to be turned such that the fan units are completely facing downward, which increases the clearance for bringing machinery into the livestock structure, such as scraper tractors utilized to manage manure within the structure.

There are design difficulties which make such a system difficult and/or expensive to install which the inventor herein has overcome. If a cooling fan system includes multiple fan units having parallel axial flows and mist dispersion, electrical and water connections must be made to each fan unit. As shown in a variety of references, such as in U.S. Pat. Nos. 6,588,372, 6,578,828, and 6,883,251 (Terrell et al.), where multiple fans rotate about a vertical axis, the axial flows of the fans may be simultaneously controlled by using horizontally oriented linkage or cables. The use of such horizontally oriented members is readily compatible with the livestock structure, where the linkage or cables may be guided or attached to horizontal beams in the livestock structure. In these types of application, electrical leads may be provided with sufficient length and slack to allow rotation of the air flow vector about a horizontal plane. These references also show that if the fans utilize water for mist/fog generation, flex line may be utilized for water delivery to allow for the required length and slack of the desired rotation about the horizontal plane.

However, for rotation about a horizontal axis (referred to hereafter as vertical rotation), particularly a rotation which exceeds a change of axial flow direction of over ninety degrees, there are potential problems with achieving simultaneous rotation, as well as in providing the required delivery of electricity and water to each fan unit.

SUMMARY OF THE INVENTION

The disclosed livestock cooling fan system may be utilized in various structures, such as livestock structures. The structure will typically have at least two vertical support columns. A generally horizontal truss structure extends between the two vertical support columns. The truss structure is rotationally attached to the vertical support columns, or to other vertical support members such as hangers depending from a horizontal beam, such that the truss structure may rotate about a horizontal axis. Within the truss structure are one or more fan units. The fan units have a fan blade housing, a fan motor, and a fan blade coupled to the fan motor. The fan blade, typically mounted on a shaft extending from the fan motor, has an axis of rotation which is perpendicular to the horizontal truss structure. This axis of rotation generally describes the axial flow of the fan. The truss structure is rotational about the horizontal axis from a first position to a second position, and any rotational position in between, during which rotation the axis of rotation of the fan blade sweeps an arc of over 45 degrees as the truss structure rotates from the first position to the second position. A rotation means is attached to the truss structure.

In conceiving the disclosed system, the inventor conceived a solution which not only provides vertical rotation in excess of ninety degrees, but also that the modular configuration of the truss structures utilized in the system allows for the prefabrication of largely identical fan modules which are attached together in an end-to-end configuration. This feature of the invention reduces much of the on-site installation time required for the present systems, which are largely customized for each installation. The modular configuration allows for a rapid installation of the system, resulting in lower installation expense, and decreasing the length of time a facility is not available for livestock usage. The invention further allows a linear array of fan modules to be rotated by a single rotation means, thus reducing cost, complexity, and maintenance. Unlike present livestock cooling fans which require a flexible electrical and water supply line for each fan, the present invention may be constructed such that only a single flexible electrical connection and a single flexible water connection are required for the entire system.

Thus, the present application discloses an apparatus which facilitates and expedites installation of the cooling fan system at an expense less than many of the known systems.

DETAILED DESCRIPTION

Figure 1:
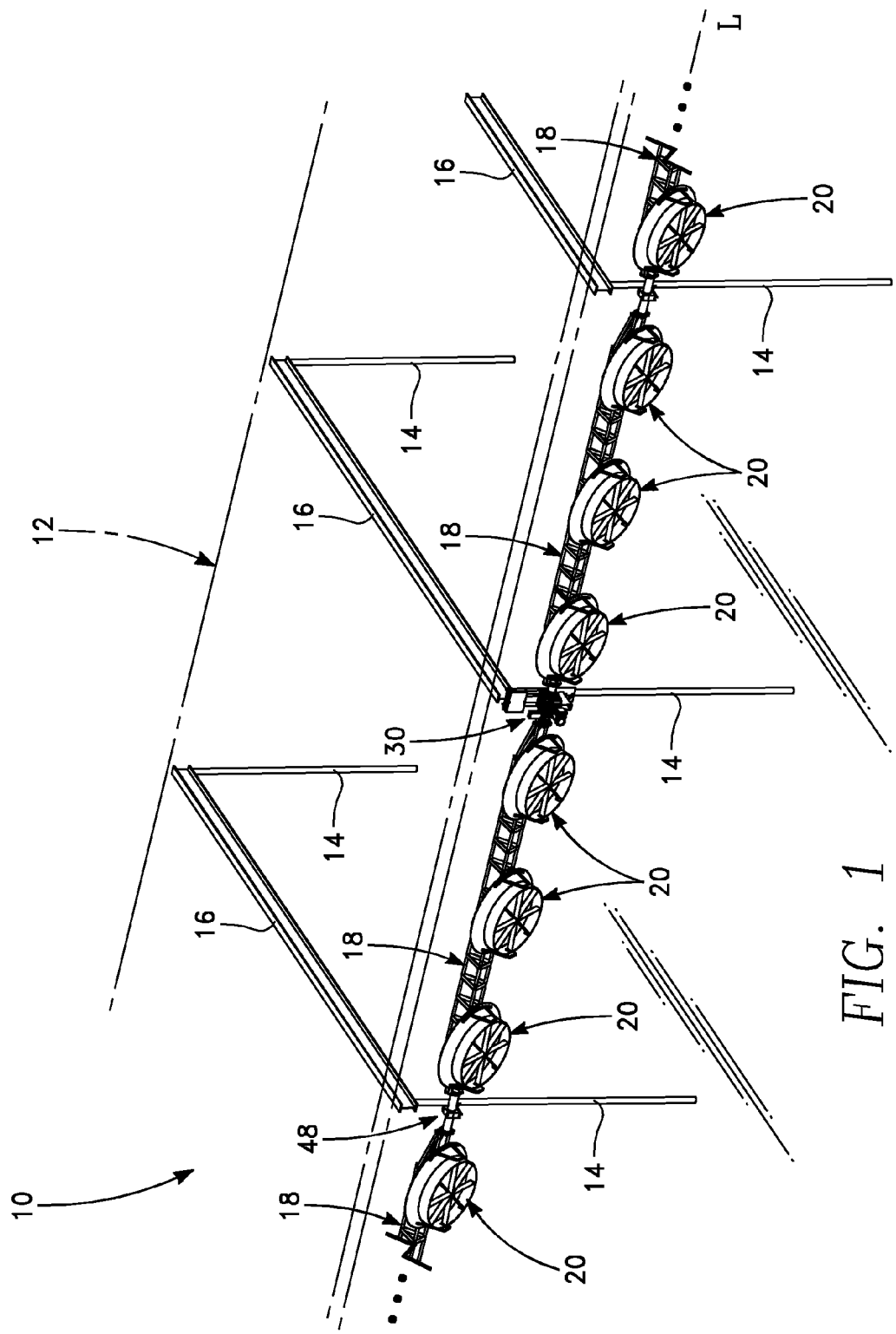
FIG. 1 shows an embodiment of the disclosed cooling fan system as installed on a livestock structure.

Referring now to the figures, a section of a cooling fan system 10 is depicted in FIG. 1. FIG. 1 generally depicts a livestock structure 12, which may be a simple shade structure, a milking barn, or other sheltering structure for livestock. Such a livestock structure 12 may comprise vertical columns 14, horizontal support beams 16 and a roof (not shown). For commercial dairies and livestock operations, the livestock structure 12 may be quite large, having sides extending hundreds of feet. Thus it is to be appreciated that FIG. 1 only depicts a section of a livestock structure 12 rather than the entire structure. As further suggested in FIG. 1, the cooling fan system 10 depicted in the figure is only a partial system. Generally, there may be a significant span between adjacent vertical columns 14, such as twenty to thirty feet. Thus the cooling fan system 10 must have sufficient structural integrity to span this distance, generally without external structural support except at the vertical columns 14, or provided by other vertical support members.

In one embodiment, the cooling fan system 10 comprises a truss member 18 which spans between vertical supports, such as vertical columns 14. While other types of vertical supports may be utilized, such as hangers depending from a horizontal beam, the vertical columns 14 are generally available for use and have sufficient structural integrity to support the load of the fan system, and are thus depicted in the figures. Modular truss member 18 is generally horizontal and is rotationally attached between adjacent vertical supports, such as vertical columns 14. As will be described in greater detail below, truss member 18 is rotational about a longitudinal axis L, which will usually be horizontal. The longitudinal axis L is defined by the long axis of the truss member spanning between the vertical columns 14.

The truss members 18 comprise one or more fan units 20. Each fan unit 20 comprises a fan housing 22, a fan motor 24 and a fan blade 26 which is coupled to the fan motor. The fan blade 26 has an axis of rotation A which is generally perpendicular (i.e., within a few degrees of perpendicular in either direction) to the horizontal axis L of the truss member 18. The axis of rotation A is defined by the shaft upon which the fan blade 26 rotates. It is to be appreciated that each truss member 18 may comprise an individual and largely self-contained fan module, where multiple self-contained modules are connected together in an end-to-end configuration, forming a line of fan modules, typically rotated by a single motor 28 and gear reducer 30 as described below. Each truss member 18 may have multiple fan units 20 as shown in the figures.

Figure 3A:
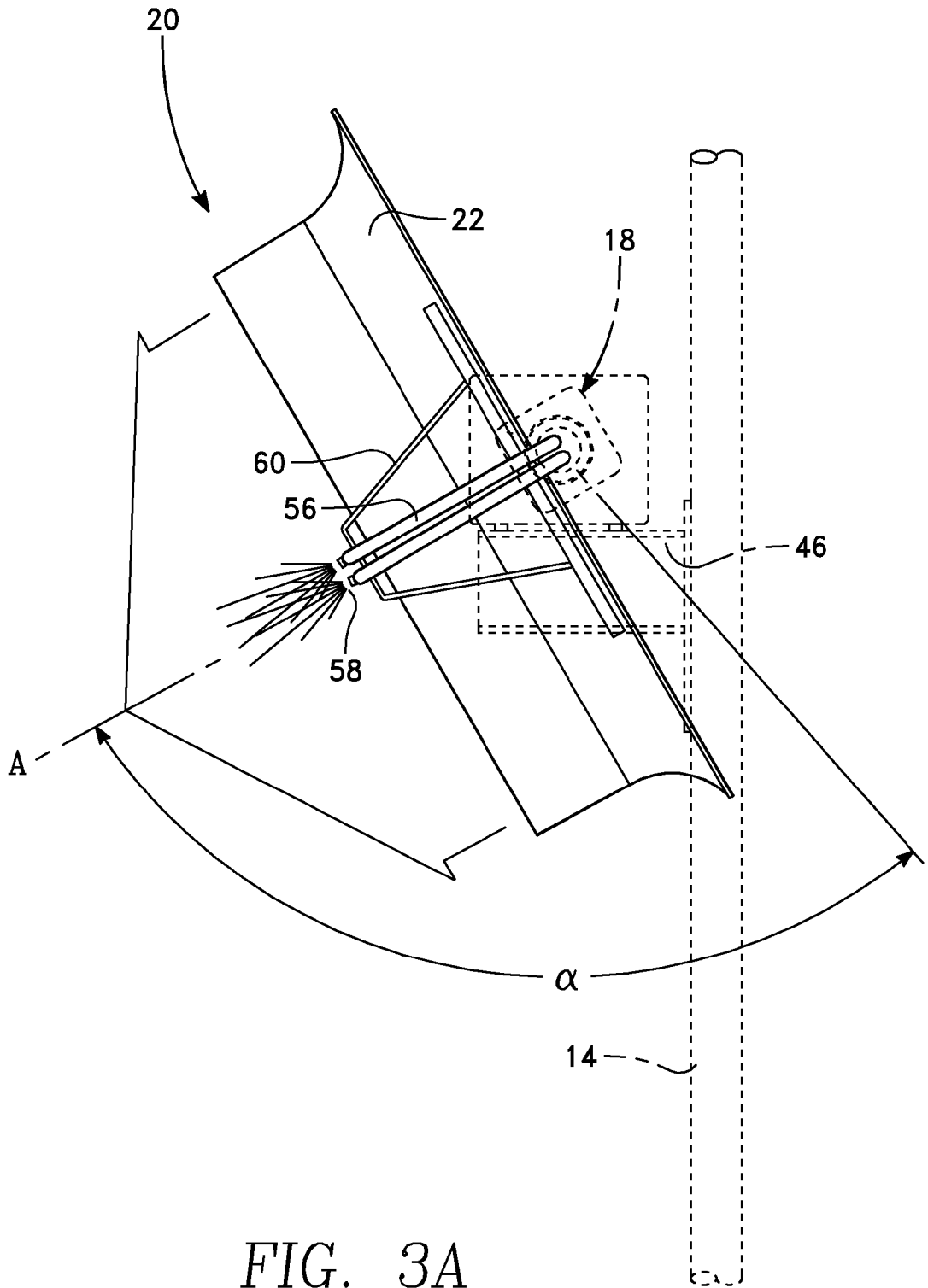
FIG. 3A shows a side view of a fan unit, indicating the expected range of rotational positions about a horizontal axis when the fan unit is in a cooling mode.
Figure 3B:
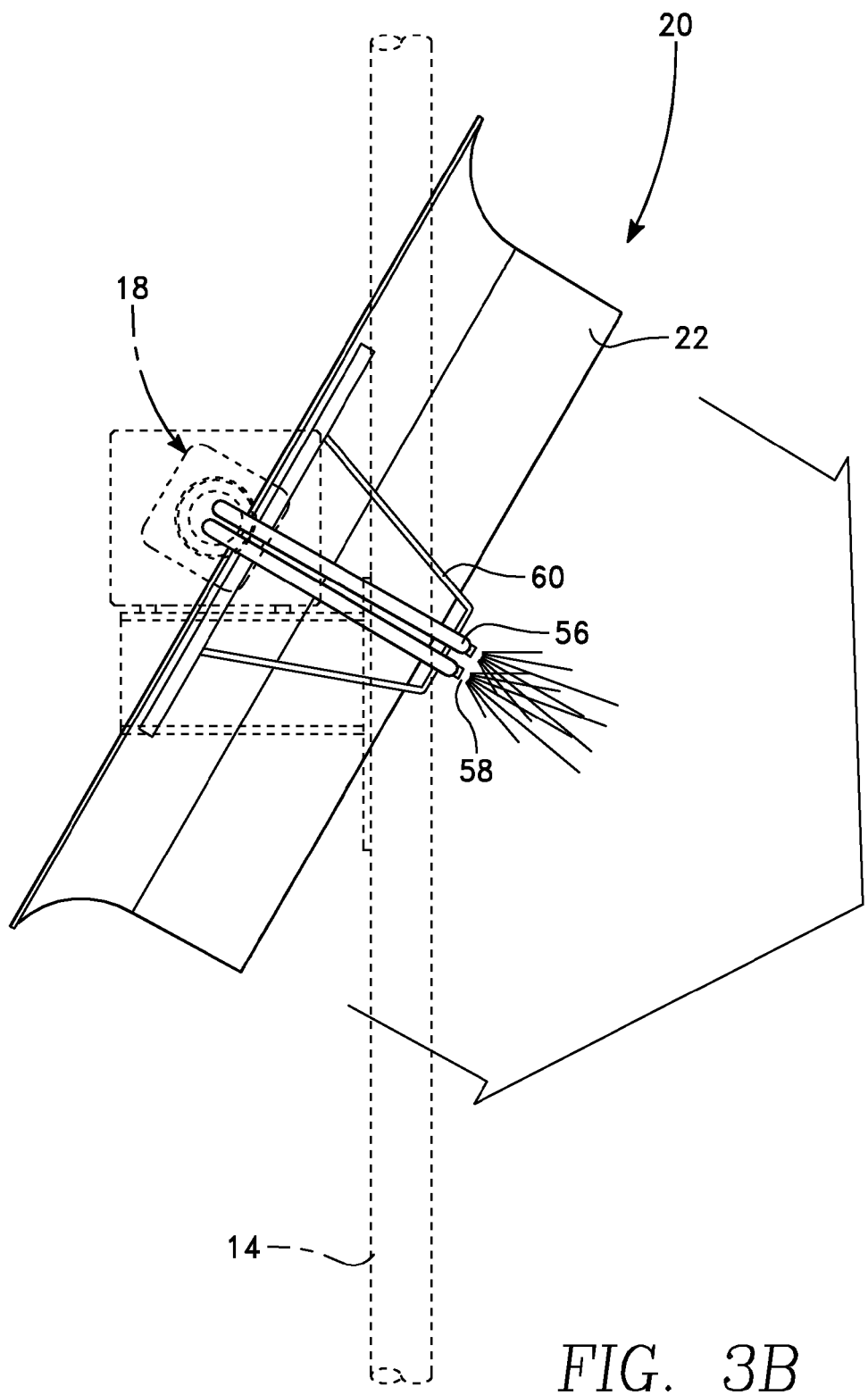
FIG. 3B shows a side view of the fan unit of FIG. 3A, showing the fan unit having rotated to a different rotational position about the horizontal axis.
Figure 4:
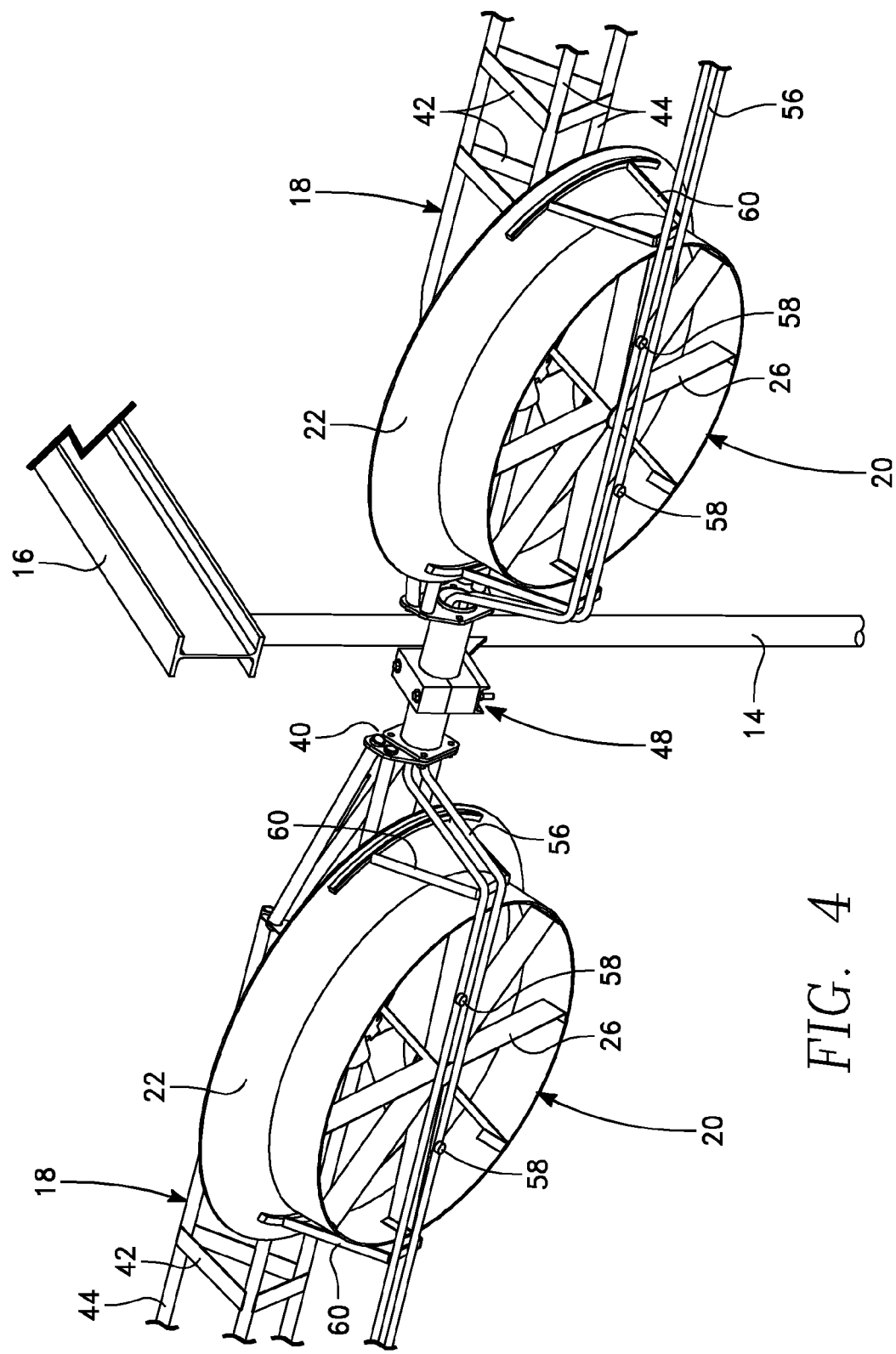
FIG. 4 shows a detailed view of how an embodiment of the disclosed cooling fan system is attached to a vertical member of a livestock structure.

The truss member 18 is rotational about the horizontal axis L to any position between a first position to a second position. Truss member 18 is rotated by rotation means attached to the truss member, such as a motor 28 coupled to a gear reducer 30. As the truss member rotates about this horizontal axis, the axis of rotation A of fan blade 26 sweeps over an arc α, as shown in FIGS. 3A-3B. To provide the desired functionality, arc α will be 45 degrees or larger up to an arc of 210 degrees. In rotating through arc α from a first position at the beginning of the arc to a second position at the end of the arc, the axis of rotation A of fan blade 26 may be stopped at any intermediate rotational position, thereby allowing the axial flow direction to be set at the optimal vertical position for cooling livestock according to the ambient wind conditions, temperature, humidity and other environmental conditions, or to park the fan units 20 with the axial flow directed downward.

Figure 5:
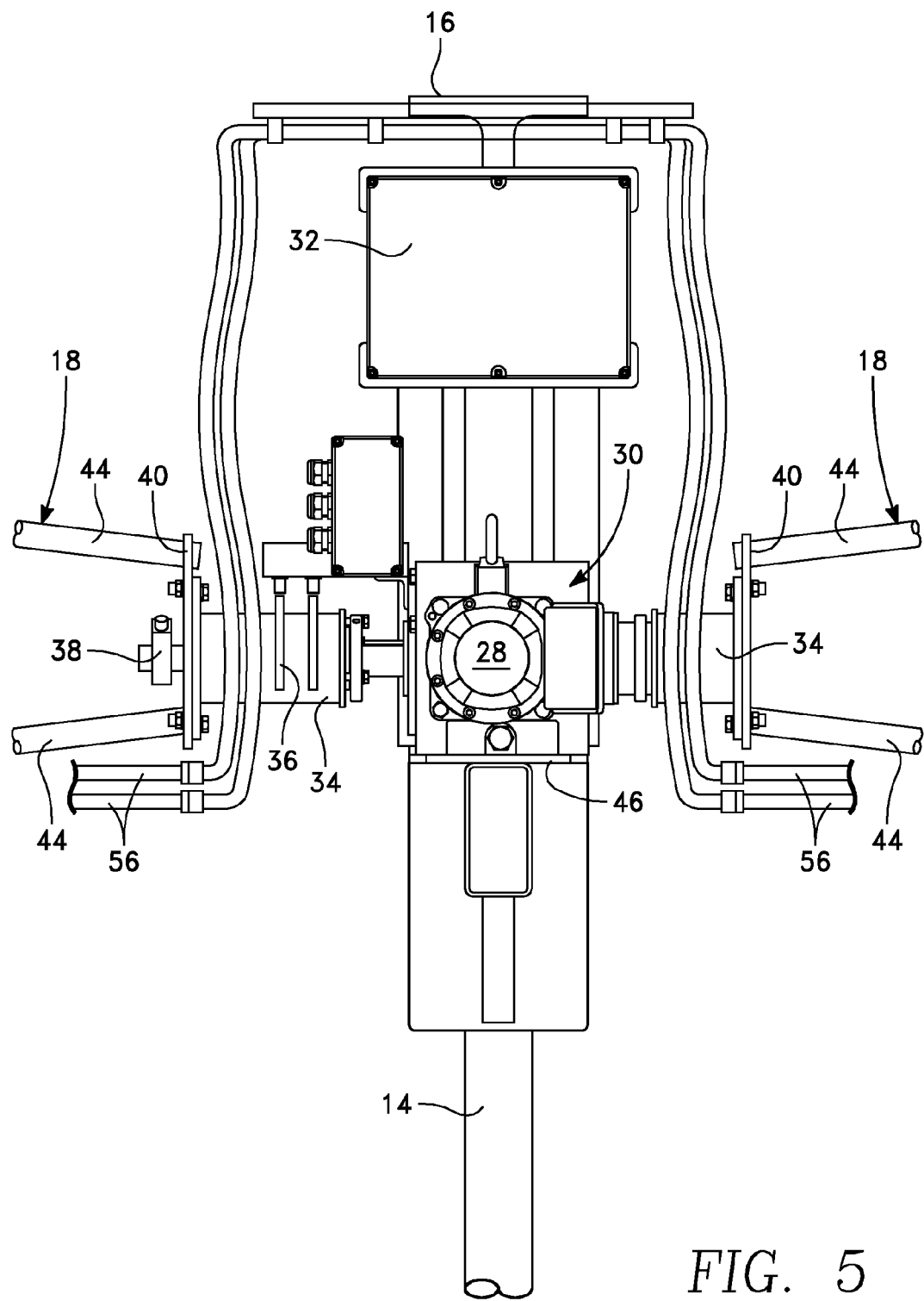
FIG. 5 shows a front view of the mechanisms which provide for rotation of the horizontal truss members.

The rotational position of the fan units 20, and hence the direction of the axial flow, may be controlled by a simple on-off switch, a programmable timer, or a programmable controller. If controlled by programmable controller, it is necessary for the controller to receive information regarding the rotational position of the fan units 20. Because the fan units will have the same rotational position as the truss member, a position sensor 38 may be utilized as shown in FIG. 5. The position sensor 38 is attached to truss member 18, and provides a signal to the programmable controller of the rotational position of the truss member. The programmable controller may receive input from a variety of other devices which measure environmental factors, such as wind velocity, wind direction, temperature, humidity, etc. and make adjustments in the rotational position of the fan units to optimize cooling to the livestock. As also shown in FIG. 5, over-rotation safety switches 36 may engage a portion of the truss member, such as drive hub 34. The over-rotation safety switches cut-off power to motor 28 if the switches sense that the truss member 18 has rotated beyond a pre-set limit.

Truss member 18 comprises truss tubes 44, which may be configured in a triangular shape. Truss support plates 42 provide structural strength and stiffness to the truss member. Truss member 18 further comprises a truss plate 40 at the end. This structural configuration, as illustrated in the figures, provides a light weight and torsionally strong member which is suitable for the required service.

For truss members on either side of the rotation means (e.g., motor 28 and gear box 30), truss plate 40 is connected to a drive hub 34 as shown in FIG. 5. As indicated in FIG. 1, for large livestock structures 12, such as those hundreds of feet across, a large number of truss members 18 may be connected together in an end-to-end configuration and the rotation motor 28 and gear box 30 are set within the approximate center of the connected truss members. In this configuration, a truss member (or fan module) may be connected on either side of the gear box 30. For smaller installations, the rotation motor 28 and gear box 30 may be set at the end of the linear array of truss members.

Figure 7:
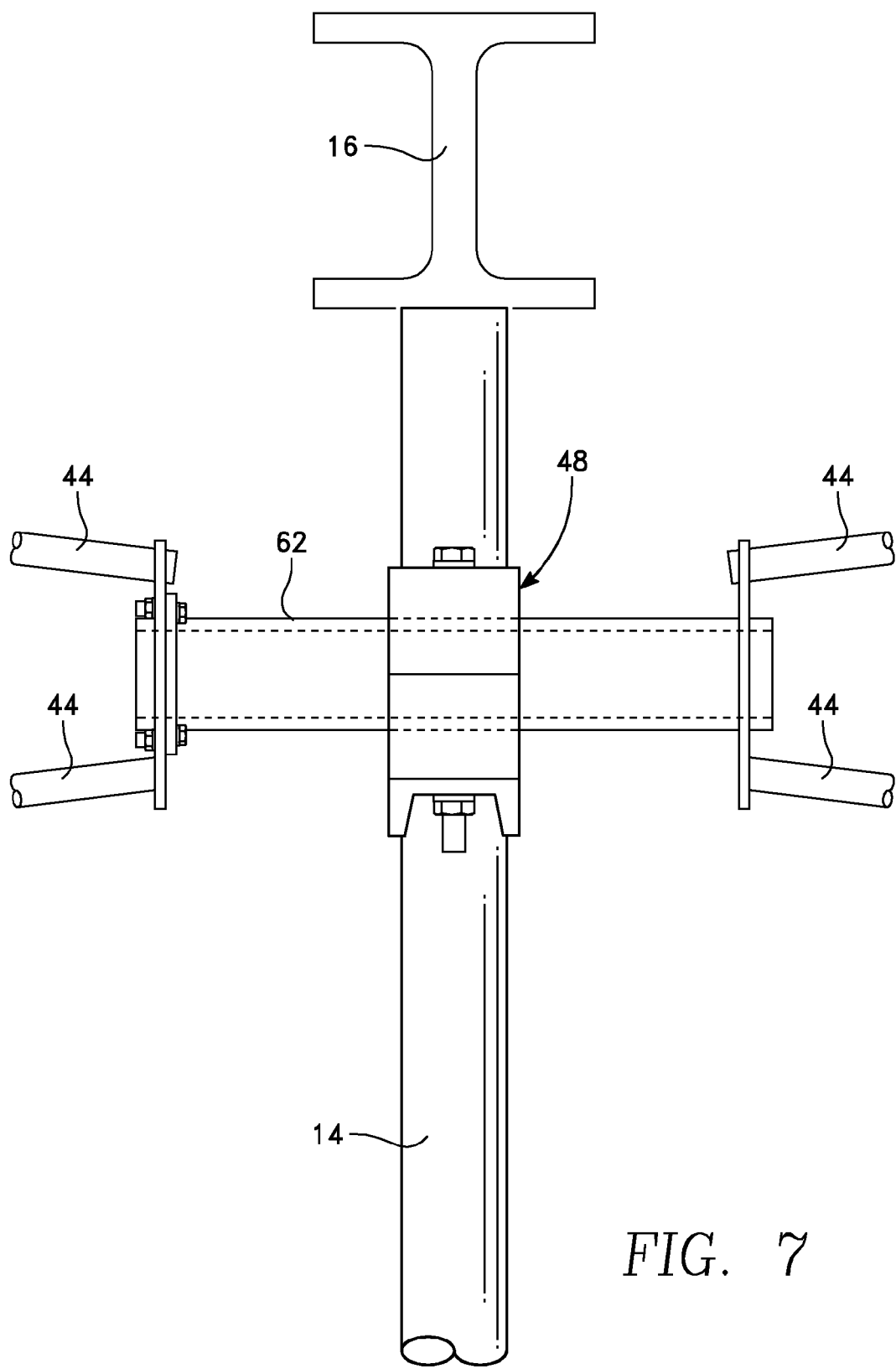
FIG. 7 schematically depicts a mechanism for connecting two adjacent horizontal truss members.
Figure 8:
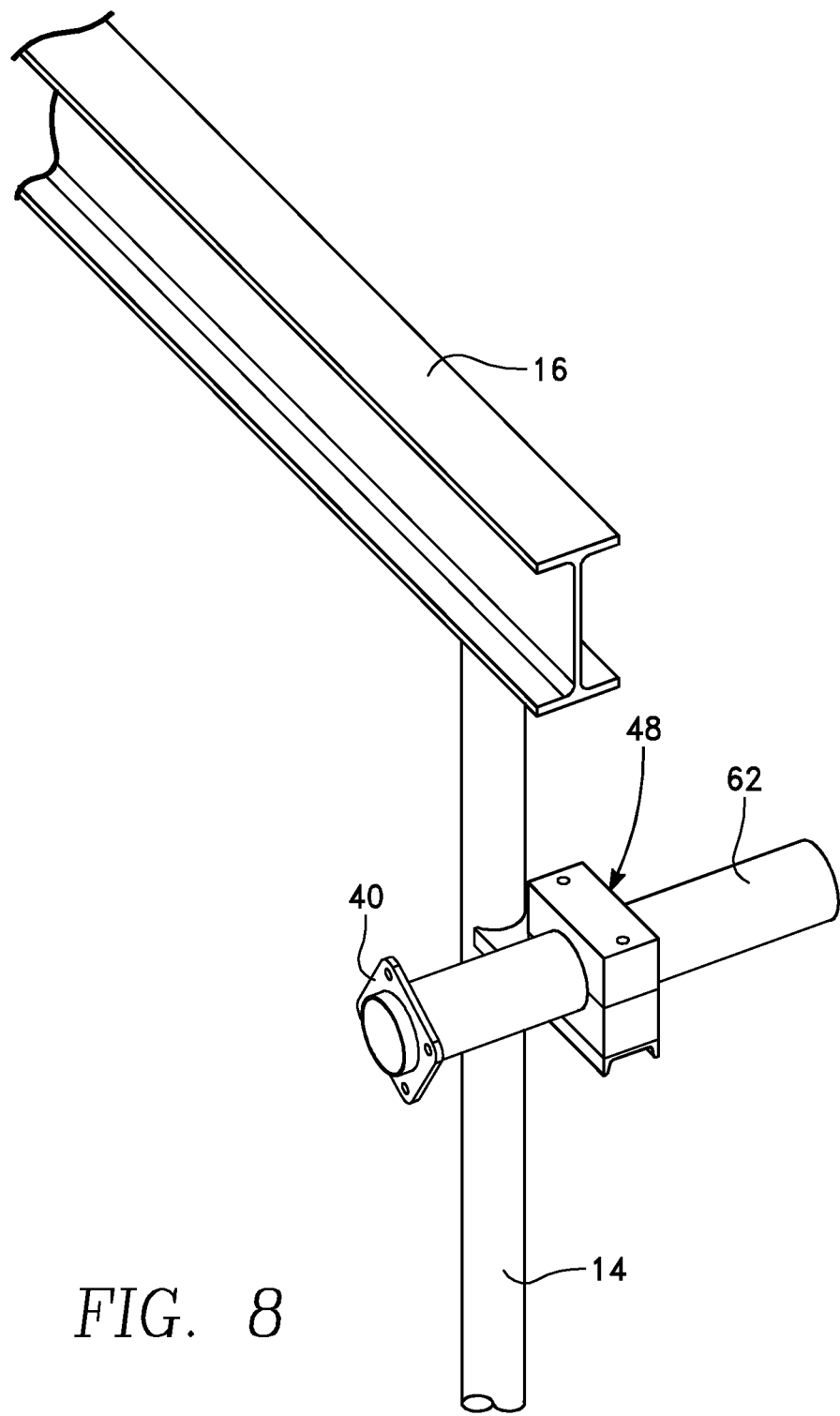
FIG. 8 shows a perspective view of a mechanism for connecting two adjacent horizontal truss members.
Figure 9:
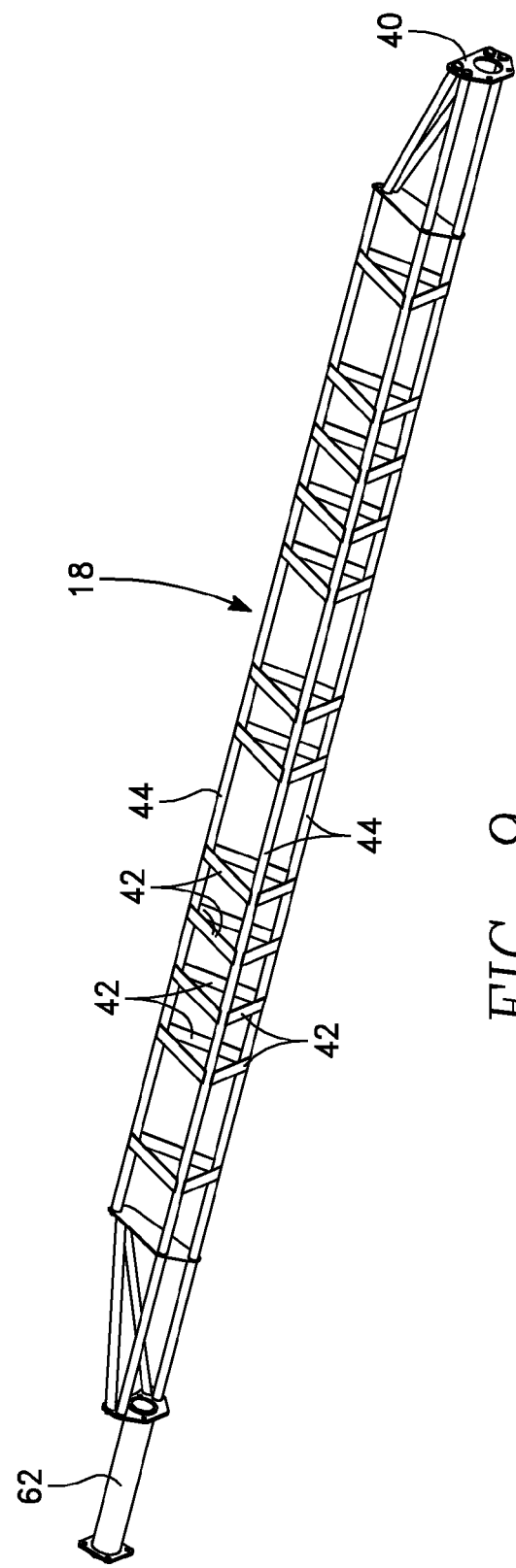
FIG. 9 shows a perspective view of a truss member, without fan units installed, which may be utilized in embodiments of the cooling fan system.

The connection between adjacent truss members 18 is shown in FIGS. 7 and 8, where a block bearing 48 or other bearing means is mounted to a structural member, such as vertical column 14. Truss connector 62 extends through the block bearing, and truss members 18 are attached to either side of the truss connector.

The livestock cooling system may further comprise water injection means, which allows the system to create a cooling mist or fog. Water droplets are injected into the air stream created by each fan 20. Water is delivered to the front of each fan 20 through a high pressure mist line 56. Stainless steel or other corrosion resistant materials with acceptable pressures ratings are acceptable materials for construction of the mist line 56, and multiple mist lines may be utilized as shown in the figures. A plurality of nozzles 58 are attached to the mist line 56, with the nozzles disposed to the front of fan blade 26. Water is delivered to the mist lines 56 by connector lines 54 which are attached to pump 50 connected to a water supply 52.

When water droplets are injected into the air stream of each fan unit 20, a mist or fog may be created, depending upon, among other factors, including environmental conditions, the volume of injected water, the injection pressure, and the droplet size. In creating mist and fog, water is emitted through very small diameter nozzles 58 at a sufficiently high pressure so as to result in extremely small water particles. When the cooling system is properly designed, the water particles will flash evaporate in the air consuming the latent heat of vaporization, which cools the air as much as 30 degrees F. which in turn cools the animals. The present system, through the combination of water pressure and/or nozzle size and/or number of mist lines activated, may provide a mist/fog having the desired qualities. The flow rate of pump 50, and thus outlet pressure, may be controlled by various pressure control means. Alternatively, multiple mist lines 56 may be utilized, wherein each mist line comprises nozzles 58 of different diameters. For example, the figures show the invention having two mist lines 56. Flow to each of the different mist lines 56 may be controlled by actuated valves, which are controlled by various control means, such as a programmable controller. As another means of controlling mist/fog quality, the pump flow rate may be increased or decreased by controlling the speed of the pump motor a variable frequency drive or other means. These parameters for controlling the mist/fog quality may be monitored and adjusted by the same programmable controller which is utilized to monitor and control the rotational position of the fan units 20, as discussed above.

Figure 2:
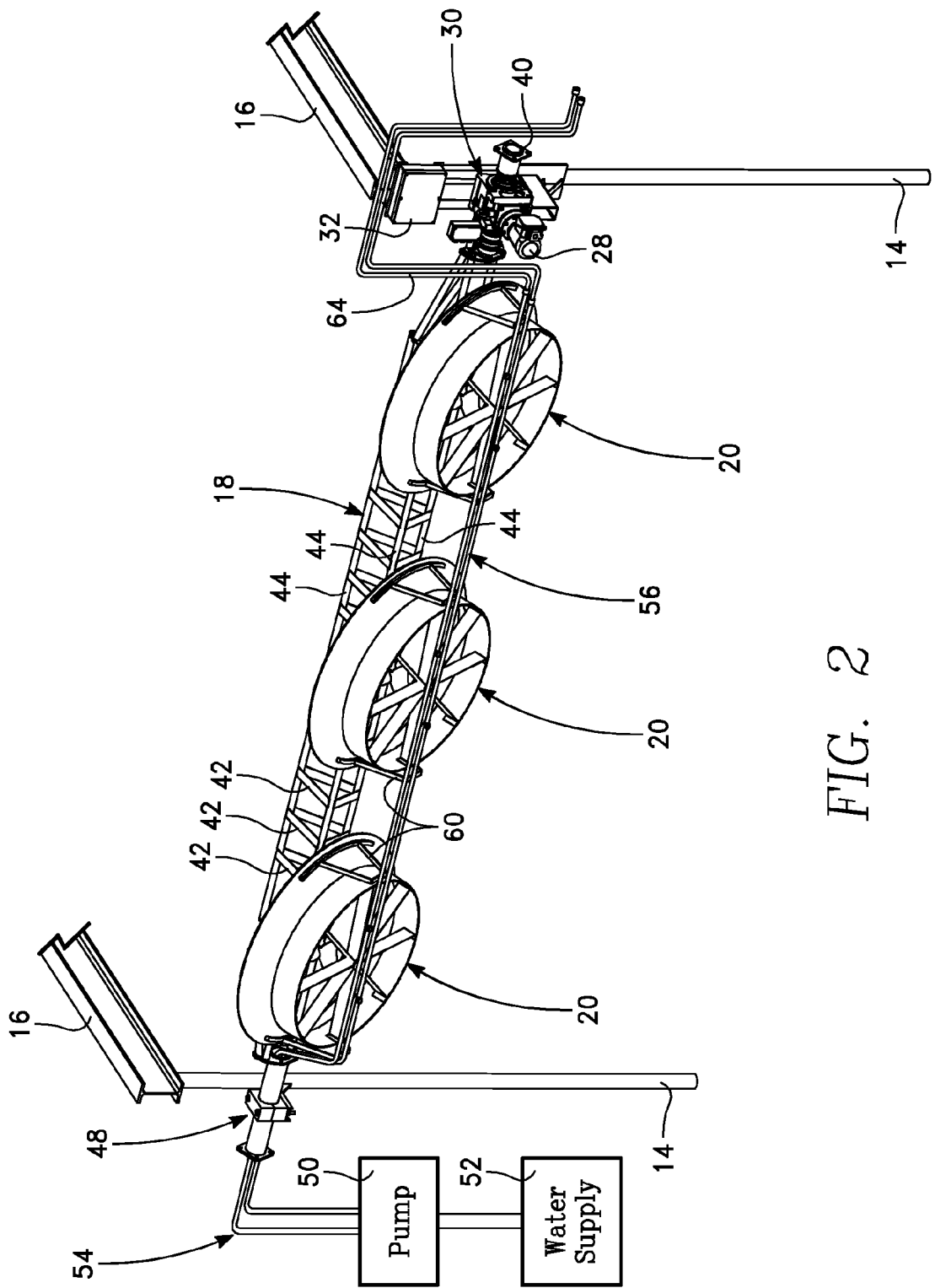
FIG. 2 shows a perspective view of a modular section of an embodiment of the disclosed cooling fan system.
Figure 6:
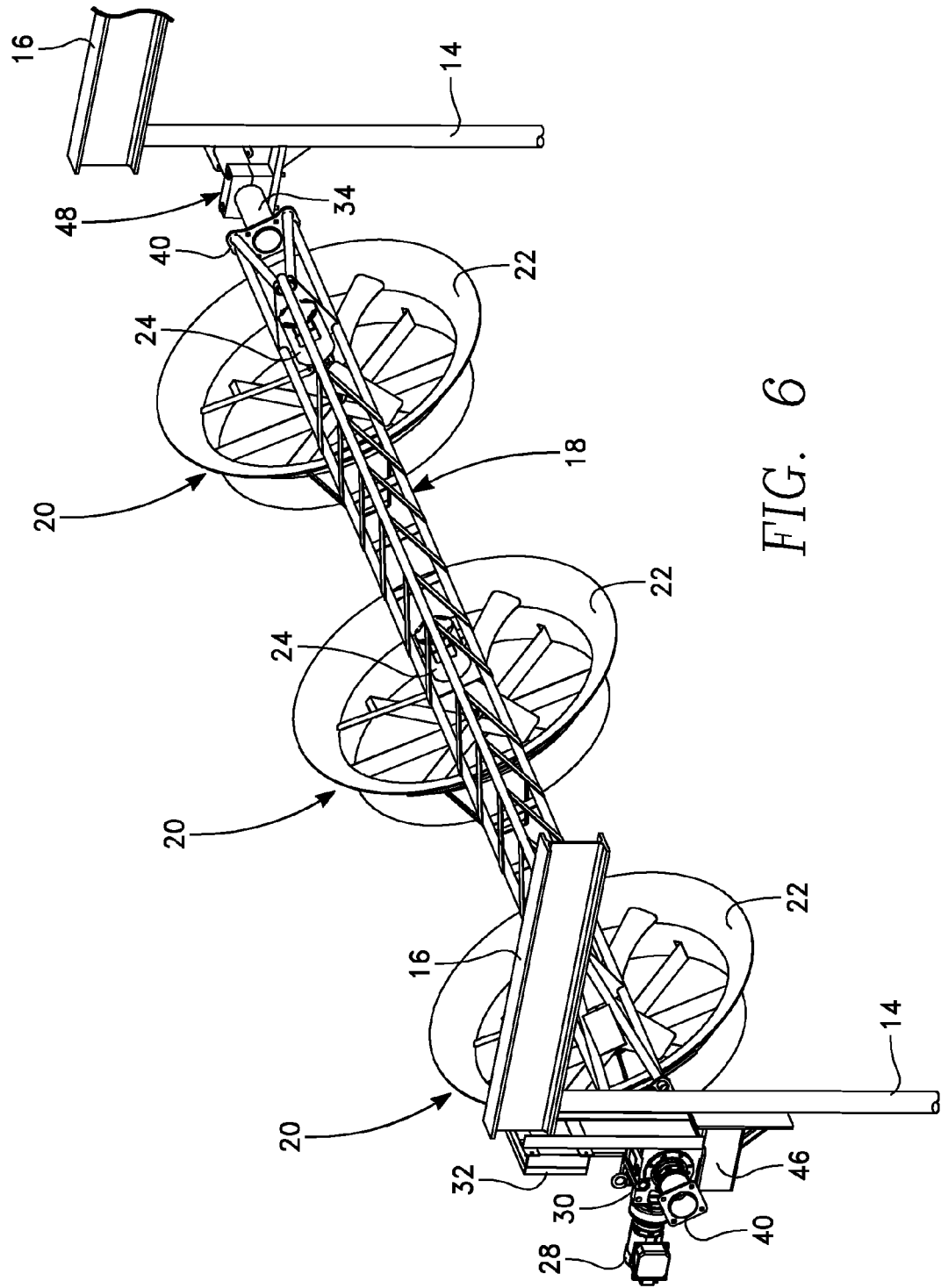
FIG. 6 shows a perspective view of a modular section of an embodiment of the fan system.

FIGS. 2 and 6 each show an individual truss member 18 spanning between two vertical columns 14. As shown in FIG. 6, the fan units 20 may be integral to the truss member 18. That is, the apparatus may be configured such that the truss member 18 provides the structural support for the individual fan components, rather than attaching a separate fan assembly to the truss member 18. In this integral configuration, fan motor 20 is attached to structural members of the truss member 18, such as truss tubes 44. Likewise, fan housing 22 may be separately supported and attached to the truss member. This configuration is advantageous because it reduces the overall weight of the truss member 18. The electrical leads (not shown) for each fan motor 20 may be routed through or along truss tubes 44 from junction box 32. Likewise, mist lines 56 are attached in segments to mist line brackets 60. Each truss member 18 may have preinstalled segments of mist line 56 which may be connected to the mist list lines of adjacent truss members, as shown in FIG. 2. As illustrated in FIG. 2, in connecting the mist lines 56 of adjacent truss members 18, the mist lines may either run through truss connectors 62 or utilize connecting sections 64 which, is required in connecting the mist lines around the gear reducer 30.

Because each truss member 18 may be packaged as an integral unit, another advantage of this configuration is that it allows each truss member 18 to be prefabricated off-site as interchangeable, linearly attachable fan modules. The known livestock cooling systems require on-site installation of each fan unit, which includes hanging or attaching the fan to a support structure and providing power and water connections to the fan. If the axial flow direction of the fans are synchronous or oscillate along a horizontal axis, as in U.S. Pat. Nos. 6,588,372, 6,578,828, and 6,883,251 (Terrell et al.), connecting linkage or cables must be run between each fan. Thus, these known systems are typically custom installations which require extensive onsite installation activities. However, because the disclosed apparatus allows the prefabrication of truss members 18 as interchangeable linearly connectable modules, each module having built-in fan components, electrical leads, and mist lines 56, the onsite installation of the cattle cooling system 10 proceeds rapidly. The installation essentially requires the attachment of each truss member 18 (also referred to as fan modules) which are prefabricated as interchangeable modules, to support platforms previously installed to structural members of the livestock structure 12, such as to the vertical columns 14. Beginning with the truss members 18 attached to the gear reducer 30, the remaining truss members are attached in order, until all of the truss members have been installed across the length of the livestock structure 12.

While the above is a description of various embodiments of the present invention, further modifications may be employed without departing from the spirit and scope of the present invention. Thus the scope of the invention should not be limited by the specific structures disclosed. Instead the true scope of the invention should be determined by the following claims.

What is claimed is:

1. A cooling fan system comprising:
   a first generally vertical truss support member;
   a second generally vertical truss support member;
   a generally horizontal truss member extending between the first vertical truss support member and the second vertical truss support member, the truss member rotationally attached to the vertical truss support members, the truss member rotational about a horizontal axis;
   the horizontal truss member comprising a fan unit, the fan unit comprising a fan blade housing, a fan motor, and a fan blade coupled to the fan motor, the fan blade having an axis of rotation, wherein the truss member is rotational about the horizontal axis to any position between a first position to a second position wherein the axis of rotation of the fan blade sweeps an arc of over 45 degrees as the truss member rotates from the first position to the second position; and
   rotation means attached to the truss member.

2. The cooling fan system of claim 1 further comprising means for determining the rotational position of the truss member.

3. The cooling fan system of claim 1 wherein the fan blade creates an air stream, and the truss member comprises a water conduit attached to the truss member, the water conduit comprising a plurality of nozzles disposed within the air stream, and a pump hydraulically connected to the water conduit.

4. The cooling fan system of claim 1 wherein the horizontal truss member comprises three tubular members configured in a triangular configuration.

5. The cooling fan system of claim 1 wherein the horizontal truss member comprises a first end attached to the rotation means and a second end attached to a second horizontal truss member, the second horizontal truss member comprising a fan unit comparable to the fan unit of the first horizontal truss member.

6. A cooling fan system comprising:
a plurality of fan modules, the fan modules connected together in an end-to-end configuration, said connected fan modules defining a longitudinal axis, said configuration comprising a first fan module having a first end connected to a rotation means, wherein the connected fan modules are rotational about the longitudinal axis to any position between a first position to a second position, the first fan module having a second end attached to a first connecting end of an axially adjacent second fan module, the second fan module comprising a second connecting end attached to an axially adjacent third fan module, and each successive fan module likewise assembled in said end-to-end configuration, wherein each fan module comprises:
a truss member comprising a fan motor, a fan blade housing, and a fan blade coupled to the fan motor; and
an electrical lead connected to the fan motor.

7. The cooling fan system of claim 6 further comprising a water conduit attached to the truss member, the water conduit disposed adjacent to the fan blade, the water conduit comprising a plurality of nozzles.

8. The cooling fan system of claim 6 wherein each fan module spans between a first vertical support and a second vertical support.

9. The cooling fan system of claim 6 wherein each truss member comprises three tubular members configured in a triangular configuration.

10. The cooling fan system of claim 6 further comprising means for determining the rotational position of the first fan module.

11. The cooling fan system of claim 8 wherein a livestock structure is supported by the first vertical support and the second vertical support.

12. The cooling fan system of claim 6 wherein the fan blade has an axis of rotation which forms an angle in a range between 50 to 90 degrees to the longitudinal axis.

13. The cooling fan system of claim 12 wherein the plurality of fan modules are rotational about the longitudinal axis to any position between the first position and the second position wherein the axis of rotation of the fan blade sweeps an arc of over 45 degrees as the plurality of fan modules rotate from the first position to the second position.

* * * * *